United States Patent [19]
Berghof

[11] 3,740,518
[45] June 19, 1973

[54] APPARATUS FOR ARC WELDING

[75] Inventor: Ernest H. Berghof, Orlando, Fla.

[73] Assignee: Anna Welding Corporation, Orlando, Fla.

[22] Filed: Mar. 9, 1972

[21] Appl. No.: 233,071

[52] U.S. Cl................ 219/72, 219/74, 219/131 F, 219/139
[51] Int. Cl.............................................. B23k 9/16
[58] Field of Search................ 219/72, 74, 73, 75, 219/147, 138, 139, 130, 131, 137, 121 EB

[56] References Cited
UNITED STATES PATENTS

| 3,632,950 | 1/1972 | Berghof | 219/72 |
| 3,671,707 | 6/1972 | Cunningham | 219/74 |
| 2,405,828 | 8/1946 | Huguley | 219/74 |
| 1,711,151 | 4/1929 | Lincoln | 219/74 |
| 3,659,076 | 4/1972 | Ogden | 219/74 |
| 1,746,207 | 2/1930 | Alexander | 219/74 |
| 2,590,084 | 3/1952 | Bernard | 219/72 |
| 2,459,812 | 1/1949 | Griffiths | 219/74 |

FOREIGN PATENTS OR APPLICATIONS

| 446,035 | 8/1946 | Italy | 219/74 |

*Primary Examiner*—E. A. Goldberg
*Assistant Examiner*—B. A. Reynolds
*Attorney*—Mortenson & Weigel

[57] ABSTRACT

There is described herein an apparatus which facilitates electric arc welding either underwater or under adverse atmospheric conditions. This apparatus includes a housing chamber having three primary apertures therein. The first and second apertures are disposed oppositely of each other. A piston-like, hollow insert is adapted to be coaxially positioned in the first aperture. A transparent viewing member is disposed in the first aperture and held in place by the insert. A contact gasket is removably secured to the periphery of the second aperture to provide a seal between the work piece to be welded and the housing. A flexible sealing gasket is secured over the third aperture and is adapted to sealingly receive the welding gun. Finally, there is a means for introducing a shielding gas into the chamber to maintain it substantially free of the fluids from the surrounding environment during the welding operation.

In underwater applications the welding electrode is held by a welding gun having a hollow guide tube which supports the welding electrode. A gas valve in the welding gun permits the entry of a gas under pressure to be introduced in the annular space within the guide tube about the welding electrode to permit a jet of gas to be used to clear the work area either when initially started or at other times during the welding process. Similarly, the welding current control switch is adapted to be surrounded by pressurized shielding gas to maintain it substantially water-free and thereby avert short circuits. A rocker arm mechanism is utilized to actuate the gas valve and the welding control switch such that either but not both may be actuated at a time. This is necessary to prevent the electrical arc from being blown out by the sharp blast of cleaning gas. The gun itself is formed of a solid member having various channels formed therein to provide for the necessary gas conduits and electrical wiring. Suitable end caps are placed over either end of the gun member to provide a water seal and to strengthen the gun.

11 Claims, 16 Drawing Figures

Patented June 19, 1973
3,740,518
3 Sheets-Sheet 1
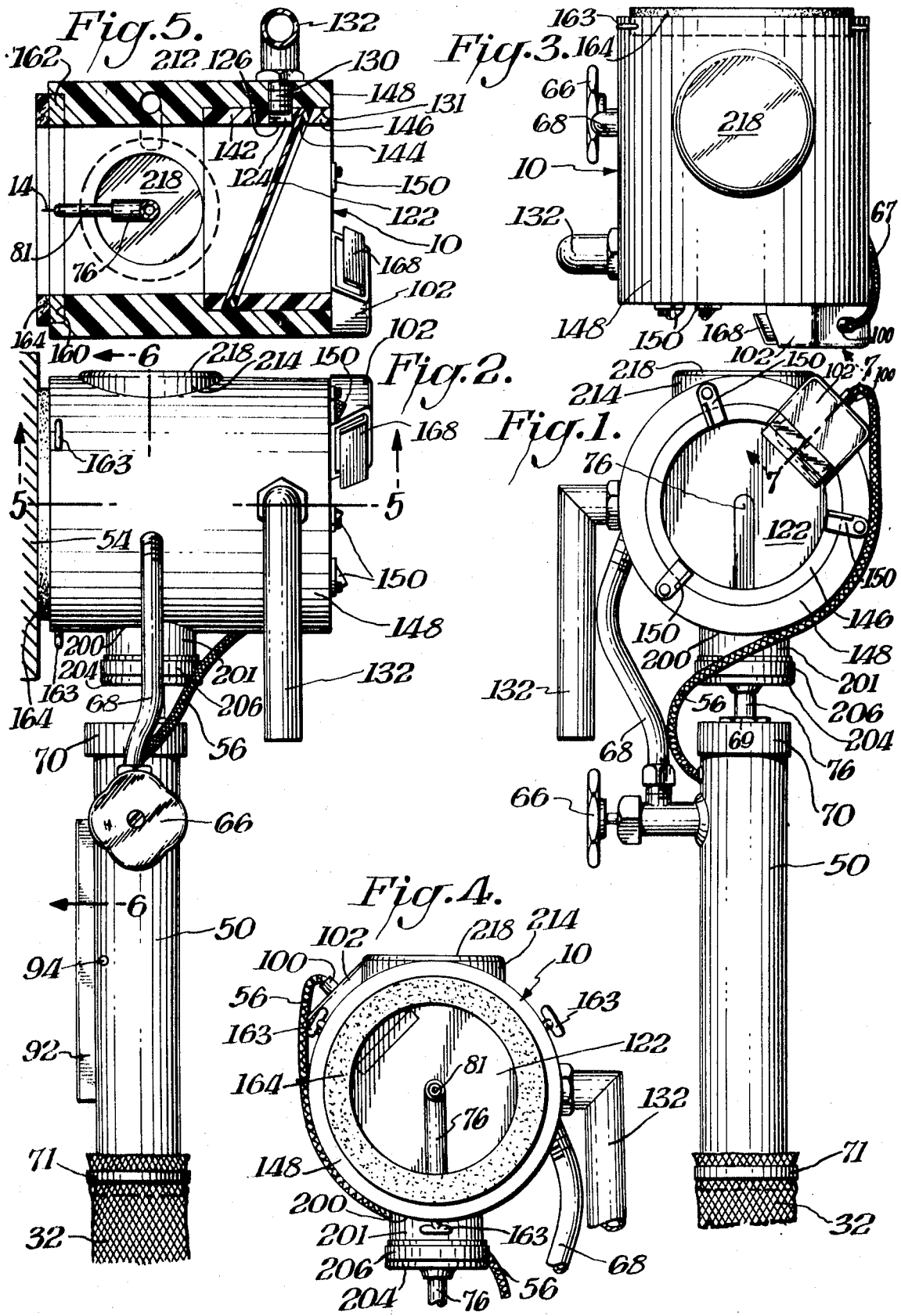

Patented June 19, 1973
3,740,518
3 Sheets-Sheet 2
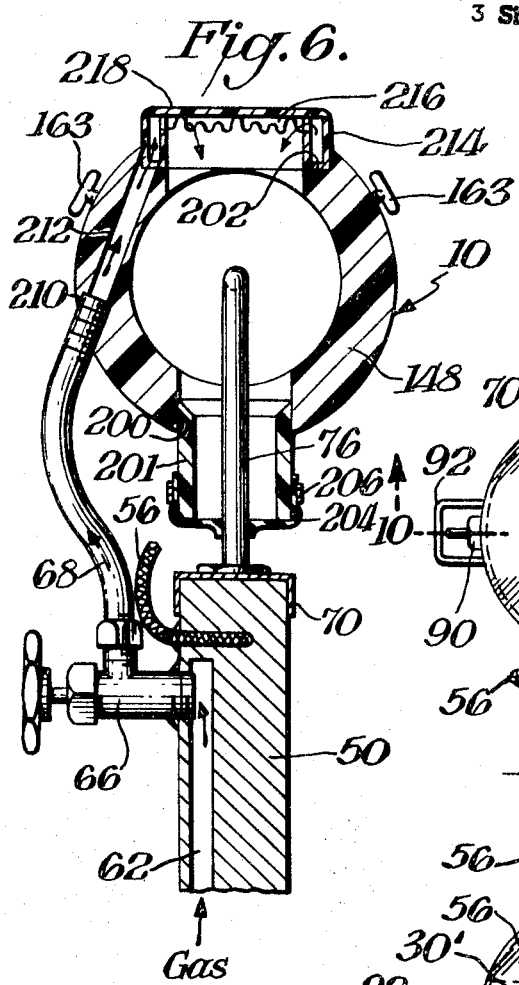
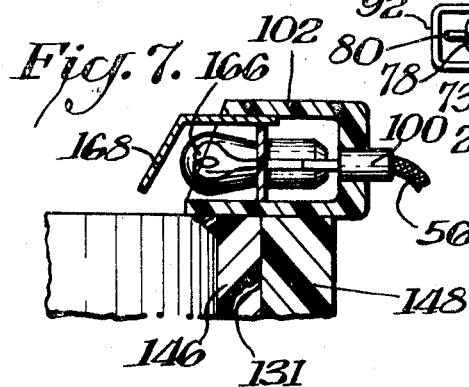
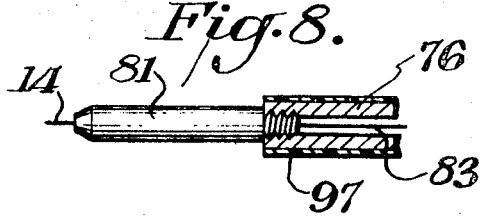
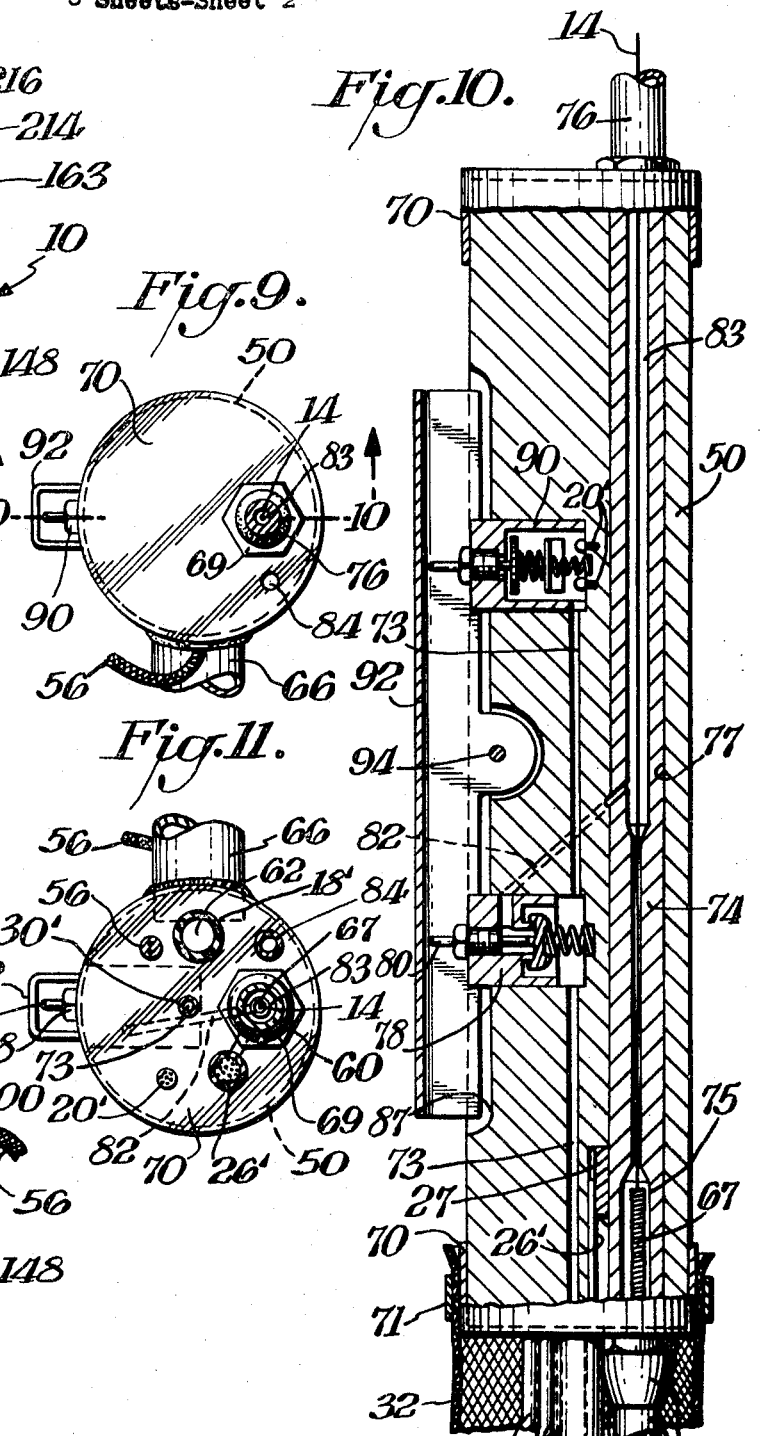

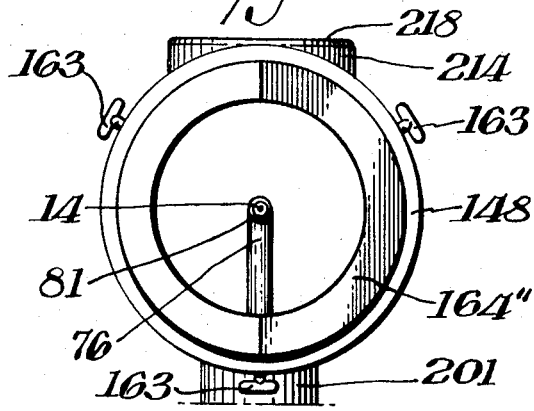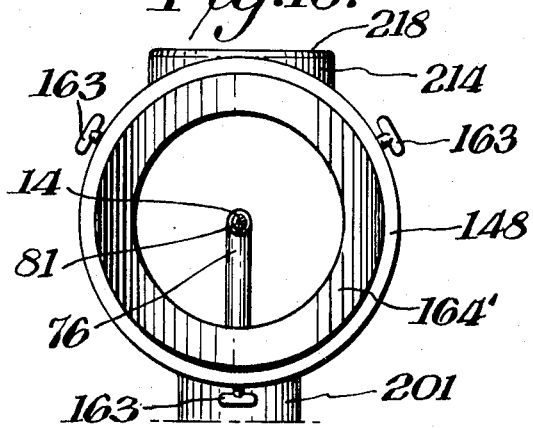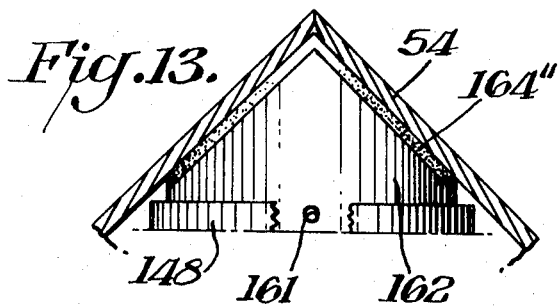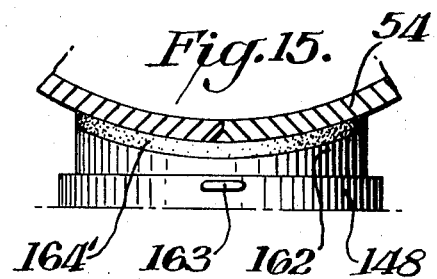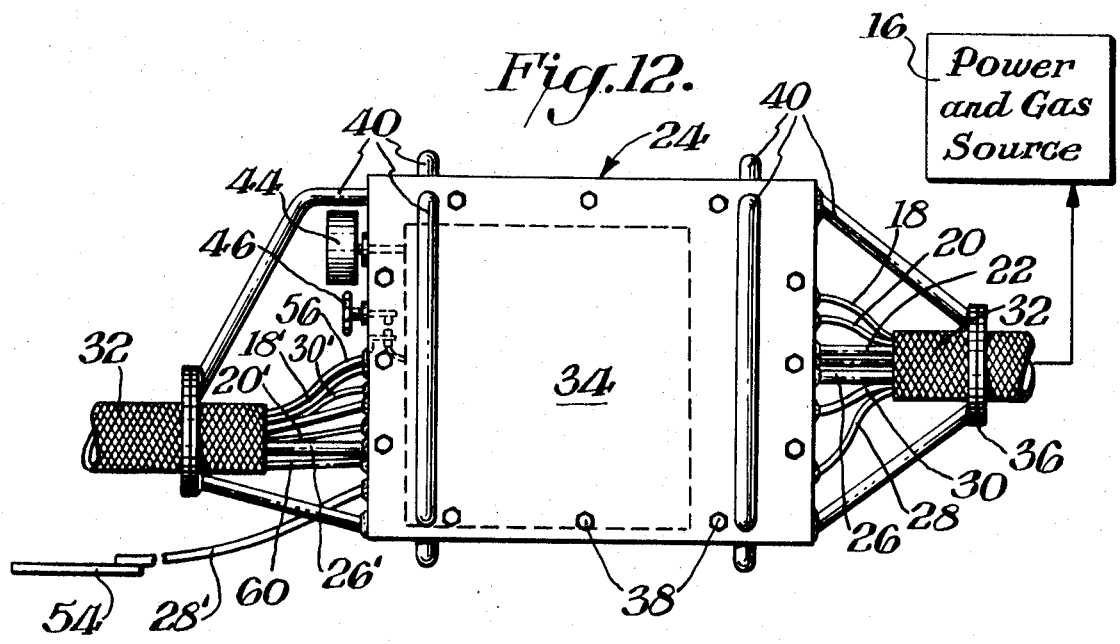

APPARATUS FOR ARC WELDING

BACKGROUND OF THE INVENTION

This invention is an improvement over an earlier filed application Ser. No. 866,245 filed Nov. 13, 1969 entitled "Method and Apparatus for Underwater Arc Welding" by Ernest H. Berghof, now U.S. Pat. No. 3,632,950 issued Jan. 4, 1972 which is a continuation-in-part of an application no. 701,700 filed January 30, 1968, now abandoned. This improvement invention relates to apparatus useful in electric arc welding in hostile fluid surroundings, including underwater, as was described in said Berghof patent and, more particularly, to gas shielded underwater electric arc welding using a consumable electrode.

At the present time underwater welds are achieved only with relatively great difficulty. In most cases, technique employed encompasses sinking a caisson or chamber over the affected area or pipe to be welded, pumping the water from within the chamber and lowering the men and equipment into the chamber where the welding is performed. The men and equipment then are removed, water is allowed to re-enter the chamber and the chamber finally removed. This procedure is not only time consuming but is expensive.

Many efforts have been made to perform underwater welding using diving equipment. In the case of electric arc welding, coated, consumable electrodes have been developed which when consumed shield the welded area sufficiently to permit a weld of sorts. Welds performed underwater using this technique, however, are generally unsatisfactory and not of the quality of welds obtainable above water.

It is, therefore, an object of this invention to provide an improved apparatus which facilitates welding using consumable electrodes, particularly in hostile environments. Also, it is difficult to achieve satisfactory arc welds on land under adverse atmospheric conditions. For example, when the wind velocity exceeds 35 miles per hour most welders are forced to stop work and wait for the wind to abate. The same is true in conditions of snow and rain — during such conditions, quality welding becomes more difficult.

While the apparatus described in said earlier filed Berghof application is quite satisfactory for all of these applications, several difficulties were encountered. For one, the illumination of the work area was somewhat less then desirable. In addition, it was discovered, due to the frequent need for replacing the viewing plate, that a far more easily removable assembly was required. And, while commercially available guns of the type disclosed in said Berghof application could be modified for underwater welding applications, they were not entirely satisfactory for underwater welding applications and often made the work somewhat difficult.

Accordingly, it is another object of this invention to provide an improved welding gun for use in underwater welding applications.

An additional object of this invention is to provide an underwater welding apparatus having improved means for illuminating the weld area and which is simply constructed and easily disassembled.

BRIEF DESCRIPTION OF THE PREFERRED EMBODIMENT

According to the preferred embodiment of this invention, the apparatus for arc welding a work-piece comprises a housing chamber having means defining first and second oppositely disposed apertures and a third aperture, a piston-like hollow insert adapted to be positioned sealingly and removably in the first aperture, a transparent viewing member adapted to be disposed over the cross-section of the insert, a contact gasket adapted to be removably secured to the periphery of the second aperture, a flexible sealing jacket secured over the third aperture and adapted to sealingly receive a welding gun, and means for introducing a shielding gas into the chamber.

The preferred embodiment of the welding gun that is used with this chamber for supplying the electrode is a solid member having a plurality of axial bores formed therein through which the shielding gas, welding electrode and electrical power are supplied. The welding electrode is fed through a guide tube which supports the electrode and provides an annular conduit about the electrode through which bursts of shielding gas may be introduced for clearing the work area of the last remnants of water or dirt after the chamber's shielding gas forces the water from around the work area. A rocker arm type switch mechanism is provided which actuates either, but not both, the gas control valve for supplying the burst of clearing gas or the electrical switch which controls the welding current to the electrode. The welding current control switch is adapted to be surrounded by shielding gas to insure its insulation from leaking water.

Further, in accordance with the preferred embodiment of this invention a light source is positioned on the exterior of the chamber and adapted to shine directly through the viewing glass to illuminate the weld area of the work-piece. With this apparatus, the portable "dry spot" or chamber of this invention, need merely be positioned with the contact gasket adjacent the work-piece and the shield gas supply turned on. This will force the water from around the work area and from the chamber. At this point, the trigger may be depressed to supply a burst of clearing gas to the work area after which the opposite end of the trigger may be depressed to energize the welding current and the welding begins. As the welding progresses the chamber is slid across the surface of the work-piece, always maintaining the weld area free of the hostile environment. The welding electrode has freedom of movement through the flexible sealing jacket to permit high quality welds even on underwater objects.

BRIEF DESCRIPTION OF THE DRAWINGS

The invention, both as to its organization and method of operation, as well as additional objects and advantages thereof, will be further understood from the following description when read in connection with the accompanying drawings which are not limitative and in which:

FIG. 1 is a back elevation view of the portable chamber and welding gun constructed in accordance with this invention;

FIG. 2 is a side elevation view of the portable chamber and welding gun assembly illustrated in FIG. 1;

FIG. 3 is a plan view of the portable chamber illustrated in FIG. 1;

FIG. 4 is a front elevation view of the portable chamber illustrated in FIG. 1;

FIG. 5 is a cross-sectional view of the chamber illustrated in FIG. 1 taken along the section lines 5—5;

FIG. 6 is a partial cross-sectional view of the portable chamber and welding gun illustrated in FIG. 1 taken along the section lines 6—6;

FIG. 7 is a fragmentary cross-section view of a lighting assembly illustrated in FIG. 1 taken along the section lines 7—7;

FIG. 8 is a fragmentary pictorial view of the removable tip and guide tube used to support the consumable electrode used herein;

FIG. 9 is a front end view of the welding gun illustrated in FIG. 1;

FIG. 10 is a cross-sectional view of the welding gun illustrated in FIG. 1 taken along the section lines 10—10;

FIG. 11 is a back end view of the welding gun illustrated in FIG. 2;

FIG. 12 is a pictorial representation of the wire feed unit and associated welding current and gas supply apparatus necessary to complete a welding system;

FIG. 13 is a partial elevation view of a contact gasket constructed in accordance with this invention for use in welding along inside corners;

FIG. 14 is a plan view of the contact gasket illustrated in FIG. 13;

FIG. 15 is an elevation view of a contact gasket useful in welding convex surfaces; and FIG. 16 is a plan view of the contact gasket illustrated in FIG. 15.

DETAILED DESCRIPTION OF THE PREFERRED EMBODIMENT

As was taught in the said earlier filed Berghof application, electric arc welding may be accomplished even in hostile environments such as underwater provided that the welding electrode and the weld area of the work-piece are shielded from such hostile environment by utilizing an appropriate shielding gas. More specifically, an electric arc is drawn between an elongated consumable electrode and the work-piece. This arc is protected from the surrounding hostile environment such as water by a flowing stream of shielding gas. The shielding gas may be any of those gases suitable for use as a welding atmosphere such as carbon dioxide and includes the inert gases, helium, neon, argon, crypton, xenon and radon. The electrode preferably is inserted into and used in a movable housing chamber which is located at the end portion of the welding gun. Within this portable or movable housing chamber the weld area itself can be viewed more easily by the operator to facilitate his making high quality welds under the various hostile environments noted.

To facilitate the description, the welding apparatus of this invention will be described in conjunction with a total system capable of achieving such results. To some extent the system described herein is the same as that described in said earlier filed Berghof application. In this system there is a suitable source of electric power together with the suitable source of the welding gases which together are denoted by the block 16 (FIG. 12). This source may include suitable equipment resting on the deck of a boat or barge on the surface of the water or underwater adjacent the weld area. For simplicity of description this invention will be described in an underwater environment. The lines running from the power and gas source 16 include a shielding gas line 18, a control cable 20 which couples back to the welding equipment to control the application of welding current. Power cable 22 supplies the necessary power to the portable wire feeding unit 24 (FIG. 12). There are also two welding current cables 26 and 28 and finally a squirter gas conduit 30. All of these wires and cables together may be enclosed within a canvas sheath 32 for protection. The sheathed wires and cables enter the wire feed unit 24 through guide rings 36 at one end. Suitable means such as sealing grommets are used to maintain a seal about the wires and cables and the interior of the portable wire feeder 24 free of water.

The portable wire feeder 24 may be a box-like structure completely sealed having a side plate 34 which is sealed by a suitable gasket (not shown) and held to the remainder of the wire feeding unit by appropriate bolts 38. Suitable gripping bars 40 may be secured to the exterior of the wire feeding unit 24 to facilitate its being picked up and carried while in use.

Of the several input cables and conduits 18, 20, 22, 26, 28 and 30, three 18, 20 and 22, connect to the interior of the wire feeder 24 whereas the remaining three — the welding current cables 26 and 28 and the squirter gas supply conduit 30 — pass straight through the portable wire feeder 24. Thus, the shield gas supply conduit 18 aides in maintaining the interior of the wire feeder pressurized by the squirter gas. The control cable 20 connects with a conventional time delay mechanism to permit the wire feed to start prior to the application of the welding current. The power cable 22 supplies power for the conventional wire feeder (not shown) within the wire feeder unit 24 as well as supplies power for the light wire on the portable welding chamber as will be described hereinafter. The wire feeder itself is not shown herein as noted but may be any of the conventional wire feeding units that are commercially available for the purpose of slowly playing out the welding electrode to the gun unit. The wire feeder is controlled with conventional controls which include a wire speed control knob 44 and an "inch" button 46. The inch button permits the electrode to be played out without the application of the welding current.

From the portable wire feeder 24 some seven cables emerge, all being sealed as they pass through the wall of the wire feeder by suitable grommets or the like (not shown) to prevent the leakage of water into the feeder 24. Thus, there is a welding current control cable 20' which passes on to a welding gun 50 (FIG. 10). The control cable is connected to a trigger switch 90 in the welding gun and functions to activate the wire feed in the portable wire feeder 24 and to apply welding current from the basic supply unit 16 to the welding electrode. The welding current itself is supplied through the cable 26' and the ground cable 28' is connected to a replaceable ground lug which is attached by welding to the work-piece. There is a light wire 56 carrying an appropriate voltage, usually 12 or 24 volts, to the light 166 (FIG. 7) on the portable housing chamber 10 as will be described hereinafter. The shielding gas is coupled through a shielding gas supply conduit 18' to the welding gun 50 as is the squirter gas supply conduit 30' and a wire feed hose 60 within which is enclosed a consumable electrode 14. In like manner the conduits and cables issuing from the portable wire feeder 24 may be gathered together in a canvas sheath 32 for protection as they extend to the welding gun 50. The hoses may be constructed of suitable rubberized or plastic flexible material, reinforced if necessary to withstand the gas pressures. The cables may likewise be of any suitable type capable of electrically insulating the electrical current carrying wires.

The welding gun 50 (FIG. 1) is constructed preferably of a solid cylindrical piece of material. Any suitable rigid, non-conducting plastic is suitable for this purpose. The cylinder has a plurality of axially disposed bores therein to accommodate the several input cables, hoses and conduits 18', 20', 26', 30', 56 and 60 from the wire feeder 24. The shielding gas conduit 18' connects to a bore 62 in the welding gun 50 which communicates with a shielding gas control valve 66 in the gun. The valve couples the gas through an orifice in the periphery of the welding gun 50 through a shielding gas conduit 68 to the housing chamber 10. The volume of the wire feeder 24 acts as a surge tank to insure an adequate supply of shield gas at high pressure. Thus, it is seen that the housing chamber 10 is removably attached to the welding gun by the conduit 68 and provides an annular nozzle or chamber about the welding gun electrode 14 as will be described.

As the electrode 14 leaves the wire feeder it passes into a liner 67 which is encased in a hose 60. The hose is attached to the end cap 70 of the gun as will be described. The liner 67 which may be a protective spiral of stainless steel wire to prevent breakage of the electrode, goes through end cap 70 and fits into a counterbore 75 in a tubular insert 74 in turn fitted into an axial bore 77 in the gun 50. The liner 67 may be supported from contact with end cap 70 as it passes through end cap 70 with a suitable insulating grommet (not shown). The tubular insert 74 may be formed of copper or other good electrical conductor and is connected to the welding power cable 26' as by soldering or brazing to a lug 27 on the insert 74. Since the electrode 14 contacts the insert 74 at many points as it progresses therethrough, it receives energy through the energized copper tubing. In the front portion of the welding gun the tubular insert 74 extends into a curved barrel assembly 76 for the electrode 14. Suitable jam nuts 69 may secure the end caps 70 and hose 72 to the ends of the welding gun. The front end of the barrel assembly 76 terminates with an interior thread to accommodate a replacable tip 81 which guides the end of the electrode 14. The tip 81 has exterior threads such that it may easily be screwed into or out of the barrel assembly 76. The sheath 32 is secured over the rear end cap 70 by a clamp 71. An epoxy coating 97 may be placed over the front end of the barrel assembly 76 to electrically insulate it from the water.

The "squirter" gas supply conduit 30' is coupled through an axial passage 73 in the gun to a gas control valve 78 positioned in a recess in the side of the welding gun. This valve 78, when its stem 80 is depressed, permits gas under pressure to flow through an angular conduit 82 (dotted lines) formed within the welding gun from the valve 78 into the smaller annular space 83 surrounding the electrode 14 within the copper tubing 74. To this end, the bore in the front end of the tubing 74 is slightly enlarged by a counterbore to accommodate the flow of the squirter gas directly through insert 74 and the barrel assembly 76 and the replaceable tip 81 to eject a stream of gas directly at the weld area. Thus, in the initial start up of the welding, this gas may be applied to clear the area of any debris, extraneous water, etc.

A welding current control switch 90 is recessed in a second cavity within the side of the welding gun 50 in axial alignment with the squirter valve 78. The axial passage 73 extends to the recess for the switch 90 so that the squirter gas pressure maintains the switch substantially free of water. Both the squirter valve 78 and the welding control switch 90 are actuated by a rocker arm type trigger 92 which is recessed in an axial peripheral slot 87 in the welding gun and pivoted at 94 such that either the welding control switch 90 or the squirter valve 78 is actuated but not both. The depression of the welding control switch 90 by the rocker arm, of course, actuates the wire feed and transmits a control signal back to the power source through the control cable 20' to energize the welding current.

The light wire 56 passes through a bore in the welding gun and out the front side adjacent to the shield gas valve 66 and terminates in a bayonet-type plug 100 (FIG. 1) which may be plugged into the light assembly 102 of the housing chamber 10 as will be described.

The housing chamber 10 for the welding electrode 14 is constructed to be generally of a hollow cylindrical shape with either end of the housing 10 defining an aperture or opening having a particular function. Thus, the lower end of the housing (FIG. 3) has a transparent viewing plate 122 (FIG. 5) to permit the operator to view the weld area. The viewing plate 122 is disposed in the lower portion of the housing 10 at an angle with respect to the axis of the housing. This permits any water, welding particles, dirt, etc. to fall to the bottom, i.e., the lowermost extremity of the plate away from the central portion of the viewing plate 122. At this extremity a vent, aperture or orifice 124 is positioned. The orifice 124 is threaded on the interior portion as at 126 to accommodate a male threaded end 130 of a vent tube 132. The vent tube itself is L-shaped and has an open end and typically may be in the order of ¼ inch to ½ inch in diameter to permit the escape of gas, water, welding particles, etc. as will be described hereinafter.

The viewing plate 122 is secured in a removable manner by forming a counter bore 131 within the housing chamber. On the inner portion of the counter bore 131 is positioned an annular support ring 142 which has one end chopped at an angle to hold the glass at the desired angular position. The desired angular position typically is at a 20° angle with respect to the axis of the cylinder in a preferred embodiment, although greater or lesser angles may be used as desired. As a practical limit, however, this angle should be restricted to something greater than 0° and less than 70°. Angles in excess of 70° cause more reflection and decrease the viewer's ability to view the weld area. A sealing gasket 144 is positioned on the opposite side of the viewing plate 122 from the support 142. The gasket may be formed of rubber or other flexible material capable of providing a pressure seal. The gasket in turn is held in position by an annular insert 146 one end of which is formed at an angle complementary to the support 142. The insert 146 is made of a diameter slightly smaller than that of the support 142 and is slip fitted into position. This facilitates the removal and replacement of the viewing plate 122. Both the support 142 and insert 146 may be made of metal or plastic as may be desired. A conventional spring-loaded, offset latching member 150 is mounted in the annulus 148 and is pivotable to hold the insert 146 in place and thereby contain the viewing plate 122 in a sealed position within the unit.

The other end of the housing chamber 10 is seen to have an internal shoulder portion 160 adapted to accommodate a sleeve which sleeve 162 may be removably inserted and fitted in the housing chamber 10 to be supported by the shoulder 160. Peripheral slots 161 (seen most clearly in FIGS. 13 AND 15) are formed in the periphery of the sleeve 162 so that it may be removably secured by wingnuts 163 in the chamber walls. A flexible gasket 164 is attached to the end face portion of the sleeve 162 to permit its contact with the welding work-piece, thereby to surround the immediate weld area and protect the electrode 14 from the water or other surrounding environment. The sleeve 162 may be formed of any metal or plastic as may be desired, although metal is preferred because of the proximity to the weld area. Although this gasket 164 may be formed of any suitable flexible material, preferably a porous rubber such as foam rubber or plastic is used. With a porous material, when the chamber 10 is pressurized, the shield gas may bubble through the gasket material and thereby prevent water from entering. This bubbling action also facilitates and serves to lubricate the movement of the gasket and the chamber 10 across the work-piece as the welding is accomplished. In general, however, any suitable flexible material capable of providing a good contact with the work-piece may be used.

A light assembly 102 is attached to the insert 146 to direct light energy from the lamp 166 contained therein through the viewing plate 122 thereby to directly illuminate the weld area. A small shield 168 prevents the light from shining directly into the eyes of the welder and thereby obscuring his vision. The shield and the light socket are preferably formed integrally to permit their removal for easy replacement of the light bulb. The light assembly 102 is adapted to receive the bayonet plug 100 of the light wire. The light assembly 102 is preferably located approximately 135° from the vent aperture 124 such that its light is directed toward the more recessed portion of the viewing plate 122, thereby creating less light reflection into the eyes of the weldor. In some applications it may be desireable to recess the light well within the insert 146 such that the light is closer to the viewing plate 122, thus reducing reflections. The light assembly is only illustrated as being exteriorly mounted for clarity of illustration.

To complete the housing chamber 10, radial apertures or openings 200 and 202 may be formed typically in one or both opposite walls of the cylindrical housing chamber 10. The orifice or opening 200 formed in the lower wall (as seen in FIG. 1 of the drawing) is adapted to permit the entry of the welding barrel 76. A short tubular extension 201 may join the aperture 200. A flexible sealing jacket 204 is fitted over this extension and held in position by a suitable retaining member 206 which may be in the form of a clamp. For this purpose it is preferred that the extension 201 be a short tubular section which may be molded contiguously with the housing 10 and radially disposed of the housing chamber 10. The flexible sealing jacket 204 should have a small central orifice to accommodate the barrel assembly 76 and permit the barrel to be pivoted relative to the aperture to permit ready freedom of movement in and about the work area.

Diametrically opposite the flexible seal gasket is the entry point for the shield gas supply. This entry point may be essentially interior of the chamber as from the tube 68. Preferably the shield gas supply tube 68, as noted, is coupled in through a male fitting (not illustrated) adapted to engage a female orifice 210 within the side wall of the chamber 10. This orifice 210 couples the shield gas through an inner conduit 212 formed within the wall of the housing chamber itself to a ring-like radial diffuser 214 which is fitted into the aperture 202 and secured by a suitable adhesive, or welded if the chamber is metal. This radial diffuser 214 has a U-shaped cross-section and inner radially disposed openings 216 so that gas may diffuse form the annulus formed by the U-shaped cross-section slowly into the housing chamber 10 from all points of the inner circumference of the diffuser 214 and thereby provide a smooth flowing path of the shielding gas without causing any high velocity gas streams which could cause a disturbance and cloud of water and/or welding particles and thereby impair the view of the welder. The diffuser 214 may be formed of two members, namely, the U-shaped annular trough-like member and a top plate 218 which encloses the diffuser. These members are secured together as by an adhesion or welding depending on the material employed.

In operation, the housing chamber 10 is positioned over the area to be welded with the gasket in contact with the weld area. Next, the shield gas control valve 66 is turned on such that shield gas can now enter the chamber and force the water in the case of underwater welding therefrom. The rear portion of the trigger 92 on the welding gun 50 is depressed and a burst of squirter gas passes through the annular space between the electrode 14 and the tip 81 thereby clearing the immediate area to be welded of any final droplets of water or particles remaining. Next, the front end of the trigger 92 is depressed thereby energizing the wire feed unit and the welding current and the weld proceeds. During this operation, the contact gasket is maintained in close contact with the surface of the work area as the weld progresses. The friction between the weld area and the contact gasket 64 is reduced by the bubbling shield gas through and around the gasket.

It is noted, as was described in the said Berghof patent, that the vent tube 132 which is rotatable is maintained in a horizontal position so long as the weld is overhead. During the time that the weld is on a vertical surface, the vent tube is maintained in a position slightly downward from the horizontal position. Similarly, when the weld is being accomplished on the top surface, the vent is maintained in a downward position with respect to the surface. The adjustment of this vent tube by its rotation aids in controlling the amount of shield gas that is discharged through the vent tube and may be adjusted as necessary by the welder.

The shielding gas that is preferred will vary as a function of the depth under the surface. Thus, at the surface, almost pure carbon dioxide ($CO_2$) may be used. However, as the weld depth increases to 50 and 80 feet and more in depth, a mixture of at least 80 percent argon and 20 percent $CO_2$ will produce a better weld. At intermediate depths, as the weld depth decreases, the ratio of argon in the mixture is decreased. At extreme depths the proportion of argon approaches 100 percent and can equal 100 percent as the depth increases beyond 100 feet. Each welder preferably will make his own adjustments to meet his own welding technique and requirement. If desired, a pressure sensor 84 (FIG. 9) may be placed in the front end of the gun 50 and used to transmit pressure measurements back to the gas supply to automatically vary the gas ratios. Other gases and gas mixtures may also be used as noted hereinbefore, however, the above noted mixture is preferred.

It was earlier noted that when welding an overhead surface, residual water as well as welding particles tend to fall onto the viewing plate. Because of the sloping surface of the viewing plate, these particles fall to the bottommost extremity of the housing where they are easily passed out due to the flowing shield gas through the vent tube. The angles of the viewing plate are preferred to be between 20° and 60° with respect to the axis. Extremely acute angles tend to obstruct the welder's vision due to refraction and also reflection of the light. Conversely, angles approaching 90° do not permit the welding particles to fall off the viewing plate and, hence, are not desirable, else the welding particles would tend to accumulate and block the vision of the welder.

In alternative embodiments of the invention the gasket is given different configurations to conform to the particular surface being welded. Thus, for a cylindrical work-piece, such as a pipe, the sleeve 162 and flexible gasket 164' may have a concave curvature in its plane (as illustrated in FIGS. 15 and 16) to conform to the exterior of the pipe. Other configurations are particularly desirable for interior and exterior corners and the like. Thus, in FIGS. 13 and 14 a flexible sealing gasket is mounted on a sleeve 162. The sleeve is illustrated as being shaped to weld an inside corner on the work-piece.

While the welding gun and its associated housing have primary application in the field of underwater electric arc welding, it is to be noted that they may also be used on land under hostile environmental conditions such as in high wind, rain, snow, and the like to protect the weld area and permit satisfactory welds to be accomplsihed, Alternatively, the portable chamber may be used with the stick electrodes in underwater applications although this is not preferred over the feed-type electrodes.

There has thus been described a unique, improved apparatus primarily for underwater arc welding. This apparatus has many advantages including a removable viewing plate, a readily replaceable illuminating light that is formed external to the housing chamber for ready replacement. Also, an integrated squirter gas jet is provided directly from the tip of the welding electrode to insure accurate direction for removal of unwanted particles. Furthermore, the welding control switch within the welding gun itself is pressurized by the gas pressure of the shielding gas supply which flows in and about the electric switch. A unique rocker arm type trigger permits selective application of either the welding current or the squirter gas.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

What is claimed is:

1. Apparatus for electric arc welding of a work-piece comprising:
    a housing chamber having means defining first and second oppositely disposed apertures and a third aperture,
    a piston-like hollow insert adapted to be positioned sealingly and removably in said first aperture,
    a transparent viewing member adapted to be supported by and disposed across the cross-section of said insert, whereby said viewing member is removably positioned in said first aperture,
    said first aperture being cylindrical and defined by a bore and counterbore forming an inner shoulder adapted to receive said insert, said insert having non-parallel end faces and being adapted to fit within said counterbore.
    means defining an exhaust port in the well of said chamber contiguous said viewing member, thereby to facilitate removal of foreign matter from said viewing member,
    a contact gasket adapted to be removably secured to the periphery of said second aperture, thereby to provide at least a partial seal between said work-piece and said housing,
    a flexible sealing jacket secured over said third aperture adapted to sealingly receive a welding electrode, and
    means for introducing a shielding gas into said chamber.

2. Apparatus according to claim 1 wherein said means for introducing shield gas includes:
    means defining a fourth aperture in said chamber, and
    diffusing means for diffusing said gas through said fourth aperture into said chamber, thereby to avoid distributing unwanted particles through said chamber.

3. Apparatus according to claim 1 which also includes illuminating means positioned externally of said chamber and adapted to direct light energy through said first aperture and said viewing member to said work-piece.

4. Apparatus according to claim 1 which includes a guide tube for housing said electrode, and sealed means for introducing gas under pressure through said guide tube directly to the work area as a jet for clearing the same of water and other undesirable matter.

5. Apparatus according to claim 4 which includes a removable nozzle tip adapted to be fitted onto the end of said guide tube, thereby to house said electrode.

6. Apparatus according to claim 4 which also includes:
    a welding gun means adapted to mount said guide tube and pass said electrode therethrough, said gun means housing a welding current control switch, and
    means for surrounding said switch with said shielding gas.

7. Apparatus according to claim 6 wherein said gun means includes:
    a gas control valve for controlling said jet of gas from said guide tube, and
    an externally located rocker arm having one end adapted to actuate said control switch, whereby either but not both of said gas control valve and said control switch may be actuated at the same time.

8. Apparatus according to claim 7 wherein said gun means is adapted to be supplied with said shielding gas under pressure, and which also includes:
- conduit means for supplying shielding gas directly to said housing chamber, and
- a second valve means for controlling the flow of said shielding gas through said conduit means.

9. Apparatus according to claim 1 which also includes:
- a welding gun means to control the passage of said electrode to said work-piece and the application of electrical energy to said electrode,
- said gun means housing a welding current control switch for controlling the application of said electrical energy to said electrode, and
- means for surrounding said switch with said shielding gas.

10. Apparatus for the underwater electric arc welding of a work-piece using a welding electrode comprising:
- a housing chamber having means defining first and second oppositely disposed apertures and a third aperture,
- a transparent viewing member adapted to be removably positioned in said first aperture,
- a contact gasket adapted to be removably secured to the exterior periphery of said second aperture, thereby to provide at least a partial seal between said work-piece and said housing,
- means for introducing a shielding gas into said chamber,
- a flexible sealing jacket secured over said third aperture, adapted to sealingly receive said welding electrode, thereby to facilitate shielding the work area of said work-piece and said welding electrode from said water using said shielding gas,
- a guide tube for housing said electrode, and
- sealed means for introducing gas under pressure through said guide tube directly to the work area as a jet for clearing the same of water and other undesirable matter and welding gun means to mount said guide tube and pass said electrode therethrough, said gun means housing a welding current control switch, and means for surrounding said current control switch with said shielding gas.

11. Apparatus according to claim 10 wherein said gun means includes:
- a gas control valve for controlling the flow of gas through said guide tube, and
- an externally located rocker arm having one end adapted to actuate said gas control valve and the other end adapted to actuate said control switch, whereby either but not both of said gas control valve and said current control switches may be actuated at the same time.

* * * * *